US010624809B2

(12) United States Patent
Tsai et al.

(10) Patent No.: US 10,624,809 B2
(45) Date of Patent: Apr. 21, 2020

(54) EXOSKELETON ROBOT AND CONTROLLING METHOD FOR EXOSKELETON ROBOT

(71) Applicant: FREE BIONICS TAIWAN INC., Hsinchu (TW)

(72) Inventors: Yi-Jeng Tsai, Taoyuan (TW); Chia-En Huang, Changhua County (TW); Ming-Chang Teng, Hsinchu (TW); Ting-Yun Wang, Hsinchu (TW)

(73) Assignee: FREE BIONICS TAIWAN INC., Hsinchu (TW)

( * ) Notice: Subject to any disclaimer, the term of this patent is extended or adjusted under 35 U.S.C. 154(b) by 309 days.

(21) Appl. No.: 15/808,558

(22) Filed: Nov. 9, 2017

(65) Prior Publication Data
US 2019/0133866 A1    May 9, 2019

(51) Int. Cl.
*A61H 1/02* (2006.01)
*G05B 1/01* (2006.01)
*B25J 9/00* (2006.01)

(52) U.S. Cl.
CPC .......... *A61H 1/0262* (2013.01); *B25J 9/0006* (2013.01); *G05B 1/01* (2013.01);
(Continued)

(58) Field of Classification Search
CPC ................. B25J 9/0006; A61H 1/0262; G05B 2219/45108; G05B 2219/37012; G05B 1/01
(Continued)

(56) References Cited

U.S. PATENT DOCUMENTS 7,153,242 B2 * 12/2006 Goffer .................. A61F 5/0102
482/66
7,549,969 B2 * 6/2009 van den Bogert .... A61F 5/0102
602/16
(Continued)

FOREIGN PATENT DOCUMENTS

CN    103153356 A    6/2013
CN    104690746     6/2015
(Continued)

OTHER PUBLICATIONS

Search report of the corresponding EP application 18178121.2 from EPO dated Jan. 16, 2019.
(Continued)

*Primary Examiner* — Dalena Tran
(74) *Attorney, Agent, or Firm* — WPAT, P.C., Intellectual Property Attorneys; Anthony King

(57) ABSTRACT

The present disclosure provides a method for controlling an exoskeleton robot. The method comprises checking that a first signal is triggered by a first button, checking a tilt angle after the first signal is triggered, setting an action based on the tilt angle, and executing the action to move the exoskeleton robot. The first signal indicates to change the exoskeleton robot from a standing posture to another posture, and the tilt angle is a leaning-forward angle of a waist assembly of the exoskeleton robot relative to a line vertical to ground. The method utilizes the tilt angle to judge the intent of the user, and thus can simplify the controlling buttons to one or two buttons. Further, the controlling method also monitors the tilt angle to choose a suitable action.

20 Claims, 9 Drawing Sheets

(52) U.S. Cl.
    CPC .............. *G05B 2219/37012* (2013.01); *G05B 2219/45108* (2013.01)

(58) Field of Classification Search
    USPC ....... 700/258; 135/67; 602/5, 16, 19, 20, 23, 602/26, 27; 482/51
    See application file for complete search history.

(56) References Cited

U.S. PATENT DOCUMENTS

| | | | | |
|---|---|---|---|---|
| 7,998,096 | B1* | 8/2011 | Skoog | A61H 3/00 601/35 |
| 2007/0056592 | A1* | 3/2007 | Angold | A61H 3/00 128/845 |
| 2010/0094188 | A1 | 4/2010 | Goffer et al. | |
| 2012/0101415 | A1 | 4/2012 | Goffer et al. | |
| 2013/0231595 | A1 | 9/2013 | Zoss et al. | |

FOREIGN PATENT DOCUMENTS

| | | |
|---|---|---|
| CN | 104758100 | 7/2015 |
| CN | 106038178 | 10/2016 |
| JP | 2012065701 A | 4/2012 |
| JP | 2015188740 A | 11/2015 |
| RU | 2598058 | 9/2016 |
| RU | 167681 | 1/2017 |
| WO | 2012027336 | 3/2012 |
| WO | WO2012027336 A1 | 3/2012 |
| WO | 2012052988 | 4/2012 |
| WO | 2016039608 | 3/2016 |
| WO | 2016164433 | 10/2016 |

OTHER PUBLICATIONS

Office Action and Search Report dated Jan. 18, 2019 by Taiwan Intellectual Property Office (TIPO) for counterpart application No. 107107633.
English abstract translation of the Office Action dated Jan. 18, 2019 by Taiwan Intellectual Property Office (TIPO) for counterpart application No. 107107633.
Foreign Patent Document CN103153356A corresponds to U.S. Pat. No. 20130231595.
Office Action and Search Report dated Mar. 18, 2019 issued by Japan Patent Office for counterpart application No. 2018-077509.
English Abstract Translation for Foreign Patent Document JP2012065701A.
English Abstract Translation for Foreign Patent Document JP2015188740A.

* cited by examiner

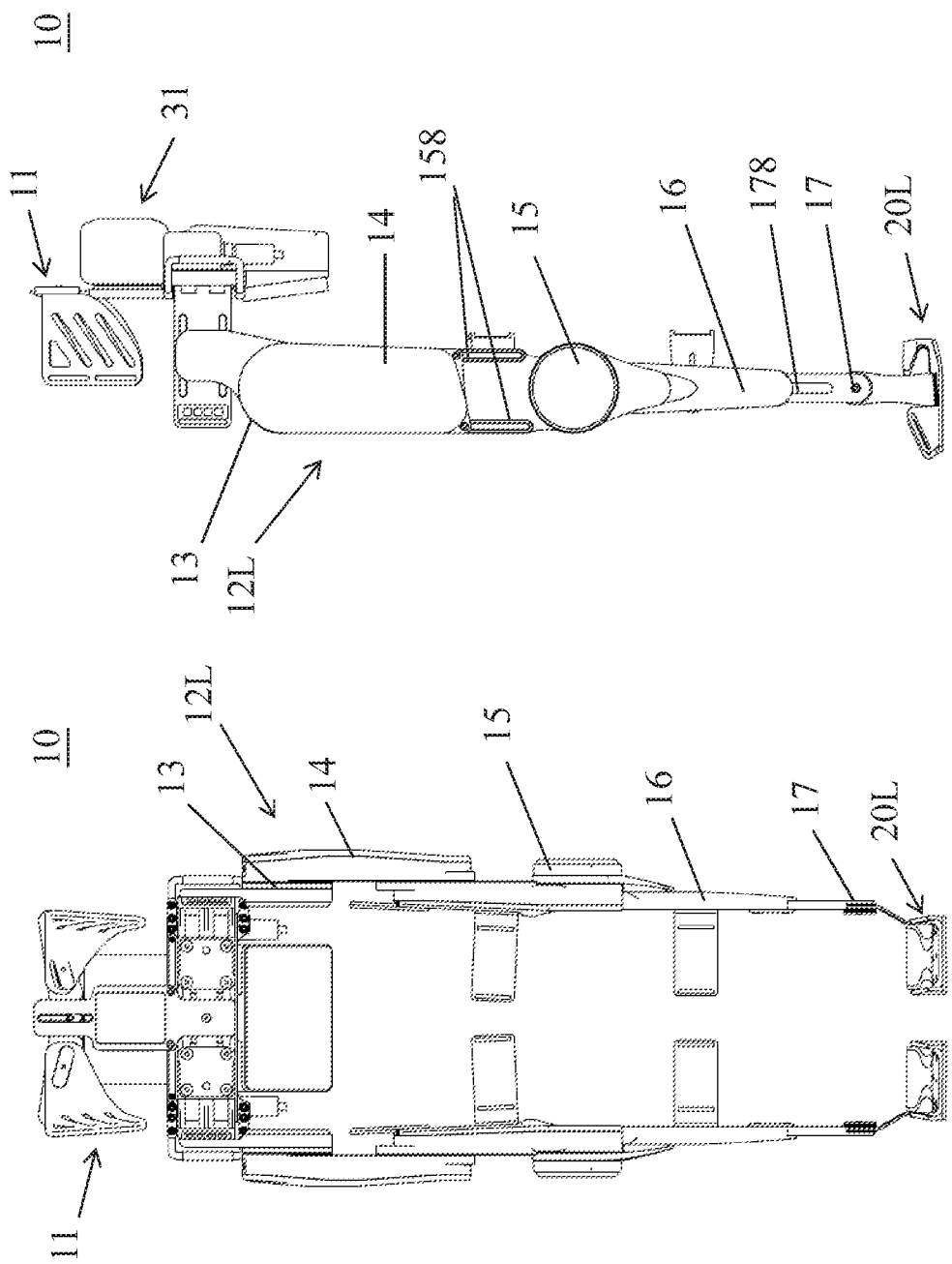

EXOSKELETON ROBOT AND CONTROLLING METHOD FOR EXOSKELETON ROBOT

TECHNICAL FIELD

The present disclosure relates generally to a walking assist device and, more particularly, to an exoskeleton robot.

DISCUSSION OF THE BACKGROUND

An exoskeleton robot, which is also known as powered armor, is a wearable mobile machine that supports the body of a user and move limbs of the user. Generally, an exoskeleton is powered by a system of electric motors, pneumatics, levers, hydraulics, or a combination of technologies that can move limbs. One of the main applications is medical. The exoskeleton robot can help persons who lose or lose control of their legs or arms due to illness or accidental injury.

While the exoskeleton robot is worn by a person, the security issue arises since the wrong movement of the exoskeleton robot may damage the life of the person. Further, the controlling method should be as simple as possible since people wear the exoskeleton robot are usually patients and may be hard to move even a finger.

SUMMARY

Embodiments of the present disclosure provide a method of controlling an exoskeleton robot. The method comprises checking that a first signal is triggered by a first button, checking a tilt angle after the first signal is triggered, setting an action based on the tilt angle, and executing the action to move the exoskeleton robot. The first signal indicates to change the exoskeleton robot from a standing posture to another posture. The tilt angle is a leaning-forward angle of a waist assembly of the exoskeleton robot relative to a line vertical to ground.

Embodiments of the present disclosure also provide a method of controlling an exoskeleton robot. The method comprises keeping checking a tilt angle while the exoskeleton robot is walking, and deciding an action to keep the exoskeleton robot walk or change the exoskeleton robot to a standing posture based on the tilt angle.

Some embodiments of the present disclosure provide an exoskeleton robot. The exoskeleton robot comprises a waist assembly, two leg assemblies, two shoe assemblies, a processor, and a detector. The two leg assemblies are pivotally connected to the waist assembly via two hip joints. The two leg assemblies comprise two thigh stands, two knee joints, and two shank stands connected to the two thigh stands with the two knee joints. The two shoe assemblies are connected to the two leg assemblies via two ankle joints. The processor is connected to two hip motors driving the two hip joints, two knee motors driving the two knee joints and, optionally, two ankle motors driving the two ankle joints. The detector detects a tilt angle and sends a tilt signal to the processor. The processor decides an action based on the tilt signal, and controls the two hip motors, the two knee motors, and the two ankle motors to control the action of the exoskeleton robot.

The present disclosure provides a controlling method that, based on the tilt angle, determines an intended posture of the user. Effectively, information on tilt angle facilitates a user to control the exoskeleton robot. As a result, the number of controlling buttons on a crutch required for the control of the exoskeleton robot can be relatively small and may be reduced to, for example, one or two buttons. Further, the controlling method of the present disclosure also monitors the tilt angle to decide an intended action as a response to an undesired condition in order to avoid the movements that conflict with the pose of the user, and thus can reduce the risk that the user wearing the exoskeleton robot may fall down.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1B and 1C are a front view and a right side view of the exoskeleton robot of FIG. 1A, respectively.

DETAILED DESCRIPTION

Figure 1A:
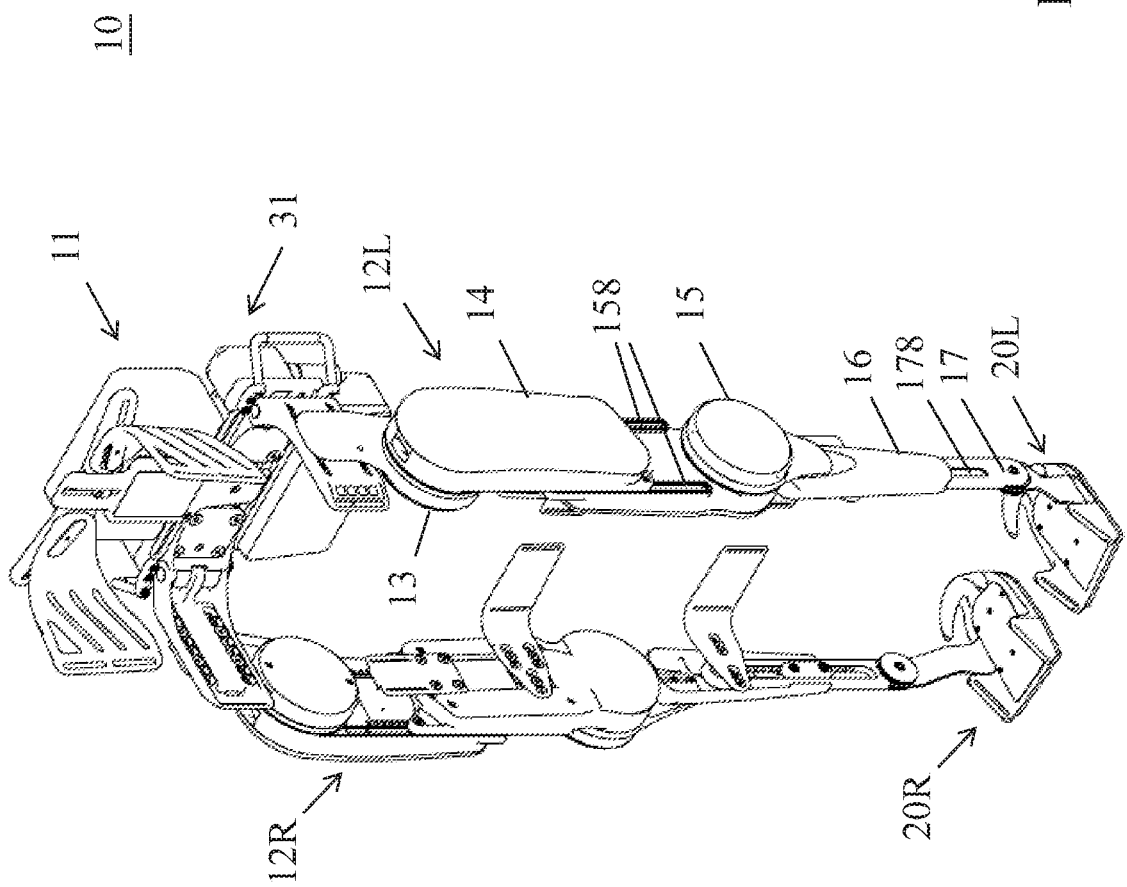
FIG. 1A is a perspective view of an exoskeleton robot based on an embodiment of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1A is a perspective view of an exoskeleton robot 10, while FIGS. 1B and 1C are a front view and right side view of the exoskeleton robot 10, respectively, in accordance with some embodiments of the present disclosure. Referring to FIG. 1A, the exoskeleton robot 10 includes a waist assembly 11, a right leg assembly 12R, a left leg assembly 12L, a right shoe assembly 20R and a left shoe assembly 20L.

The waist assembly 11 is configured to support a user of the exoskeleton robot 10 at the waist. Each of the right leg assembly 12R and the left leg assembly 12L is pivotally connected to the waist assembly 11 via a respective hip joint 13. As a result, the right leg assembly 12R and the left leg assembly 12L are rotatable with respect to the waist assembly 11. Since the right leg assembly 12R and the left leg assembly 12L are symmetric in physical configuration to each other, for convenience, only the left leg assembly 12L is discussed.

The left leg assembly 12L includes a thigh stand 14, a shank stand 16, a knee joint 15 and an ankle joint 17 in addition to the hip joint 13. The thigh stand 14, having an elongated shape, is pivotally connected at one side (not numbered) to the waist assembly 11 via the hip joint 13, and pivotally connected at another side (not numbered) to the shank stand 16 via the knee joint 15. As a result, the thigh stand 14 and the shank stand 16 are rotatable with respect to the knee joint 15. Moreover, the thigh stand 14 is movable along a first adjusting means 158 of the knee joint 15 in the elongated direction so that the length of the left leg assembly 12L at the thigh portion is adjustable to suit the user's need. In the present embodiment, the first adjusting means 158 includes a pair of slots stretched in the elongated direction. In other embodiments, the first adjusting means 158 may include grooves, rails or sliding rods that facilitate the adjustment lengthwise.

The shank stand 16, also having an elongated shape, is pivotally connected at one side (not numbered) to the thigh stand 14 via the knee joint 15, and pivotally connected at another side (not numbered) to the shoe assembly 20 via the ankle joint 17. As a result, the shank stand 16 and the left shoe assembly 20L are rotatable with respect to the ankle joint 17. Moreover, the shank stand 14 is movable along a second adjusting means 178 of the ankle joint 17 in the elongated direction so that the length of the left leg assembly 12L at the shank portion is adjustable to suit the user's need. In the present embodiment, the second adjusting means 178 includes a slot stretched in the elongated direction. Alternatively, the second adjusting means 178 may include grooves, rails or sliding rods that facilitate the adjustment lengthwise.

The thigh stand 14, shank stand 16, hip joint 13, knee joint 15 and ankle joint 17 are similar to those disclosed in the U.S. application Ser. No. 14/519,145, entitled "Walking Assist Device," filed 21 Oct. 2014 and referenced herein, and therefor are not described in detail. For more information on the physical relationship among and the functions of the thigh stand 14, shank stand 16, hip joint 13, knee joint 15 and ankle joint 17, reference can be made to the disclosure of the '145 application.

Figures 2A, 2B:
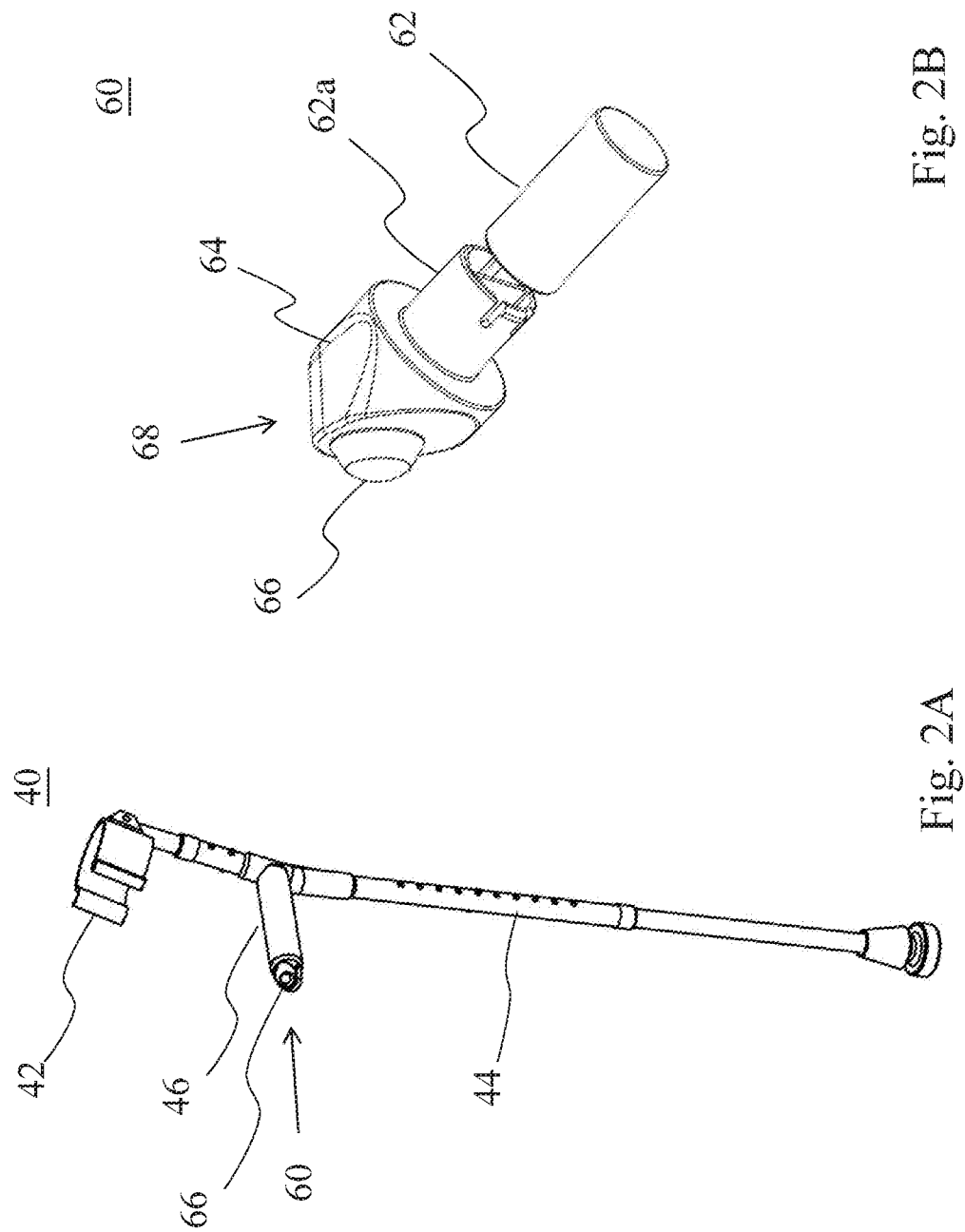
FIG. 2A is a perspective view of a crutch for controlling the exoskeleton robot of FIG. 1A.
FIG. 2B is a perspective view of a remote control device illustrated in FIG. 2A.

FIG. 2A is a perspective view of a crutch 40 for controlling the exoskeleton robot 10 of FIG. 1A. Referring to FIG. 2A, the crutch 40 includes an arm rest 42, a shaft 44, a grip 46 and a remote control device 60. The remote control device 60 with a button 66 is installed in the grip 46. Usually, the exoskeleton robot 10 may comprise or work with a pair of crutches 40, a right crutch and a left crutch, which may have the same or similar structure. For convenience, only one of the crutches 40 and only one remote control device 60 associated with the one crutch are discussed with reference to FIGS. 2A and 2B. While the right crutch 40 and the left crutch 40 are exchangeable, for a right handed user of the exoskeleton robot 10, the right crutch 40 can be the first crutch, whose button 66 can be triggered to generate a first signal. Further, the left crutch 40 can be the second crutch, whose button 66 can be triggered to generate a second signal. In an embodiment, the first signal indicates checking a tilt angle of waist assembly 11 of the exoskeleton robot 10 (shown in FIG. 1A), and the second signal is used to confirm the action decided based on the tilt angle. In another embodiment, the second signal indicates stopping walking from a walking posture when the user wants to stop.

FIG. 2B is a perspective view of the remote control device 60 illustrated in FIG. 2A. Referring to FIG. 2B, the remote control device 60 includes a button 66 at a front end 64, and a battery box 62a. The battery box 62a can be installed into the grip 46 of the crutch 40. The battery box 62a contains a battery 62. The remote control device 60 further includes a button 66 at the front end 64, and a transmitter 68 inside the front end 64. The transmitter 68 is configured to transmit a signal triggered through the button 66 by a user of the exoskeleton robot 10.

Figure 2C:
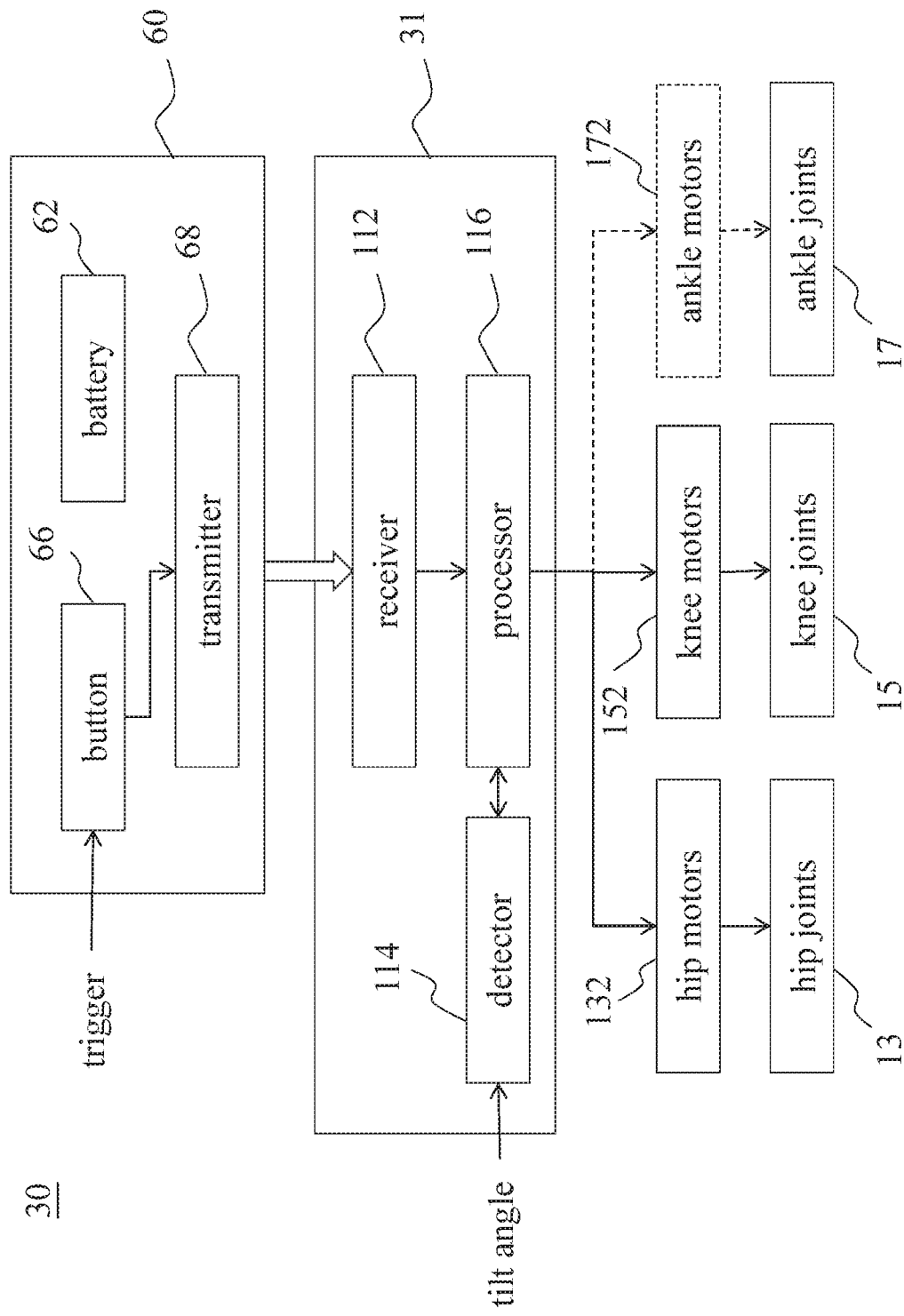
FIG. 2C is a block diagram of a system for controlling the exoskeleton robot of FIG. 1A.

FIG. 2C is a block diagram of a system 30 for controlling the exoskeleton robot 10 of FIG. 1A.

Referring to FIG. 2C, the system 30 includes a controller 31, motors 132, 152, 172 and the remote control device 60. The controller 31 includes a receiver 112, a processor 116 and a detector 114. The receiver 112 is configured to communicate with the transmitter 68 wirelessly by, for example, Beacon or Radio Frequency (RF). The transmitter 68 transmits the trigger signal, which indicates that the button is triggered, to the receiver 112. In the embodiment shown in FIG. 2C, the controller 31 is located in the waist assembly 11 (shown in FIG. 1A). The controller 31 controls motors 132, 152 and 172 in response to a user command sent via a remote control device 60 and in response to a tilt angle detected by the detector 114. The processor 116 is wired or wirelessly connected to two hip motors 132 located near and driving the two hip joints 13, two knee motors 152 located near and driving the two knee joints 15 and two ankle motors 172 located near and driving the two ankle joints 17.

In some embodiments, a detector 114 may be a gyroscope included in the controller 31 and may be wired or wirelessly connected to the processor 116. The detector 114 detects a tilt angle and sends a tilt signal to the processor 116. The tilt angle refers to an angle of the waist assembly 11 of the exoskeleton robot 10 when leans forward with respect to the normal of a ground surface. As a result, the tilt angle is positive when a user of the exoskeleton robot 10 is intended to lean forward. In contrast, the tilt angle is negative when a user of the exoskeleton robot 10 is intended to lean backward. After the processor 116 gets the tilt signal from the detector 114, the processor 116 decides an action based on the tilt signal indicating the tilt angle. The action matches the intent of the user based on the current tilt angle, i.e., the current posture, of the user. On the basis of the decided action, the processor 116 controls the two hip motors 132, the two knee motors 152, and the two ankle motors 172 to control the action and adjust the posture of the exoskeleton robot 10. By taking the tilt angle as a factor to decide an intended action and adjust the posture of the exoskeleton robot 10, the present disclosure brings a favorable effect to prevent the exoskeleton robot 10 from doing unsuitable actions. For example, when the upper body of the user or the waist assembly 11 is leaning backward or standing upright, the exoskeleton robot 10 will not keep walking forward and thus will reduce the risk that the user wearing the exoskeleton robot may fall down.

Figure 3:
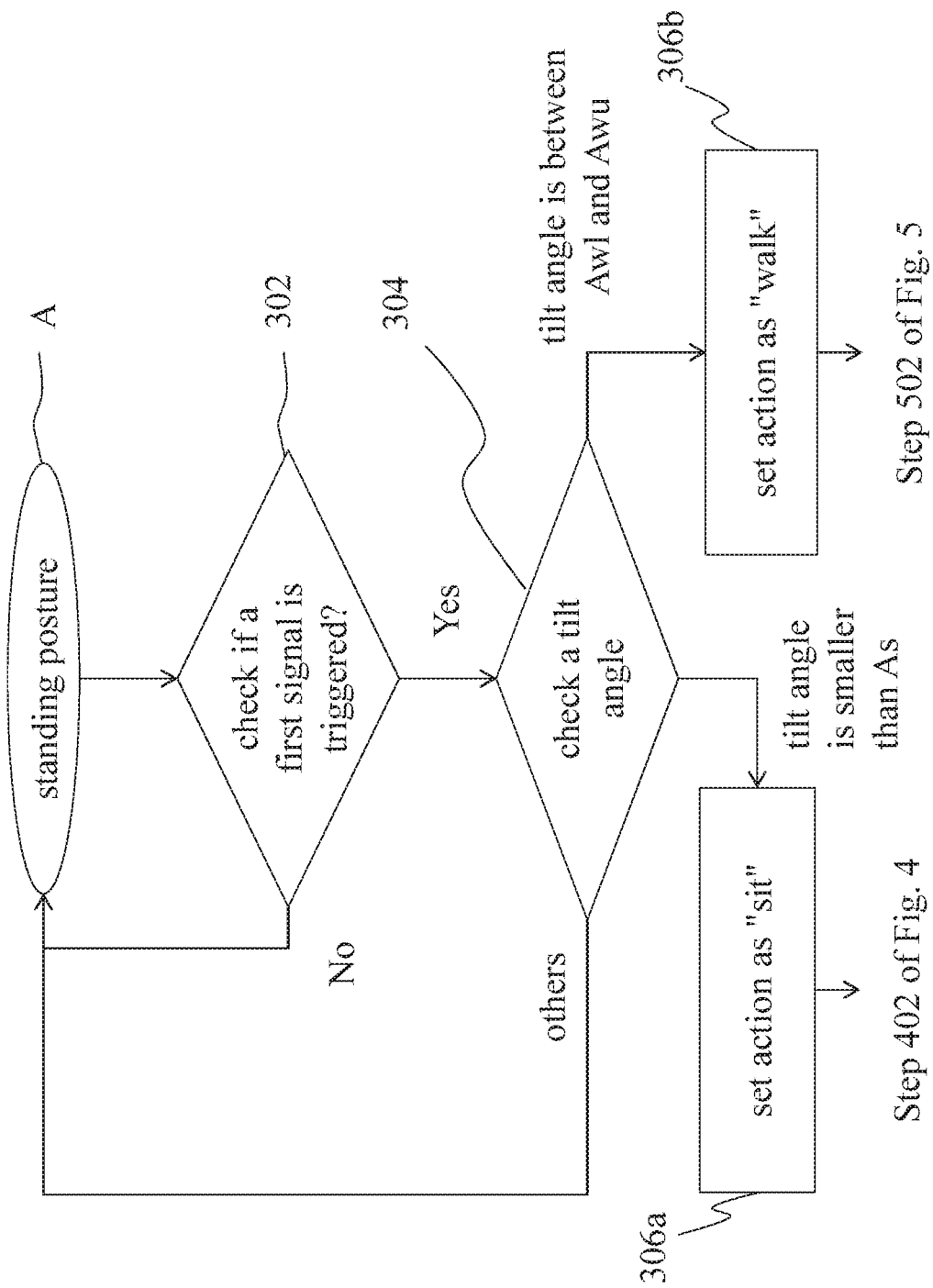
FIG. 3 is a flowchart illustrating a method for controlling the exoskeleton robot of FIG. 1A to change from a standing posture to a sitting or walking posture, based on an embodiment of the present disclosure.

FIG. 3 is a flowchart illustrating a method for controlling the exoskeleton robot of FIG. 1A to change from a standing posture to a sitting or walking posture, based on an embodiment of the present disclosure. The flow starts from a standing posture, the status A. In step 302, a first signal is determined triggered by, for example, the processor 116 illustrated in FIG. 2C. The first signal is kept being checked until the first signal is triggered.

In step 304, a tilt angle is checked based on the tilt signal generated by the detector. If the tilt angle is suitable for the sitting action, for example, smaller than a sitting upper bound angle (As), the processor will set the action as "sit" and prompt the action to the user in step 306a. Because the sitting upper bound angle (As) is a negative value, which means a lean-backward angle, a tilt angle smaller than the sitting upper bound angle (As) means an angle with a larger absolute value to lean backward. Otherwise, if the tilt angle is in the angle range suitable for the walking action, for example, between a walking lower bound angle (Awl) and a walking upper bound angle (Awu), the processor 116 will set the action as walk and prompt the action to the user in step 306b.

Figure 4:
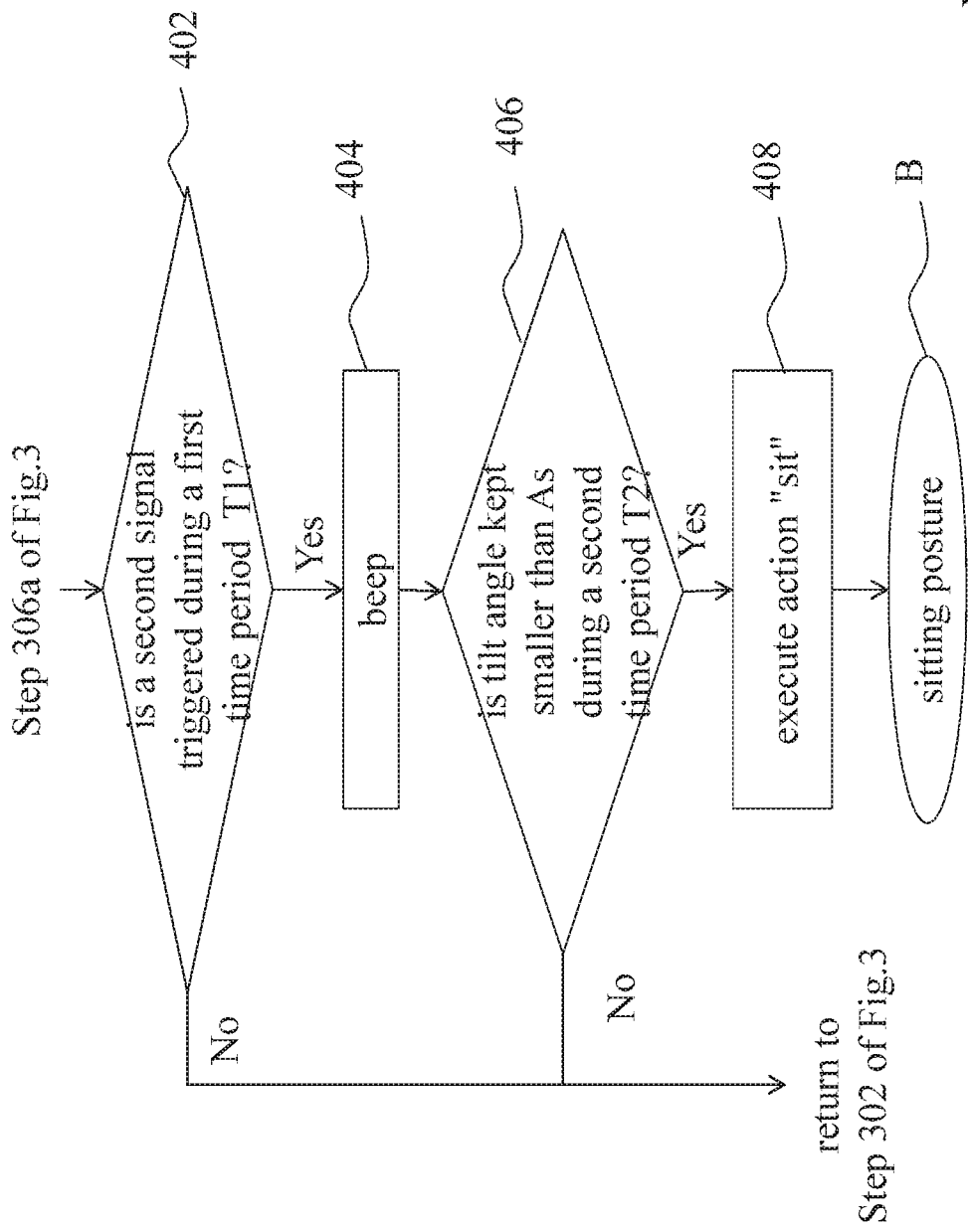
FIG. 4 is a flowchart illustrating a method for controlling the exoskeleton robot of FIG. 1A to execute a sit action when a sitting posture is determined in FIG. 3.

FIG. 4 is a flowchart illustrating a method for controlling the exoskeleton robot of FIG. 1A to execute a sit action when a sitting posture is determined in FIG. 3. After step 306a of FIG. 3, the flow goes to step 402 to check if the second signal is triggered during a first time period T1. In step 404, an alarm, such as beep, will be sounded if the second signal is received during the first time period T1. In step 406, the tilt angle is kept being checked until the beep ends after a second time period T2. If the tilt angle keeps be suitable for the sitting action, for example, smaller than a sitting upper bound angle (As) during the second time period T2, the action "sit" will be executed in step 408, and the posture of the exoskeleton robot 10 will be changed to the sitting posture, the status B. Otherwise, if the tilt angle cannot keep be suitable for the sitting action during the second time period T2, the action "sit" is cancelled, and the exoskeleton robot is restored to the standing posture.

Figure 5:
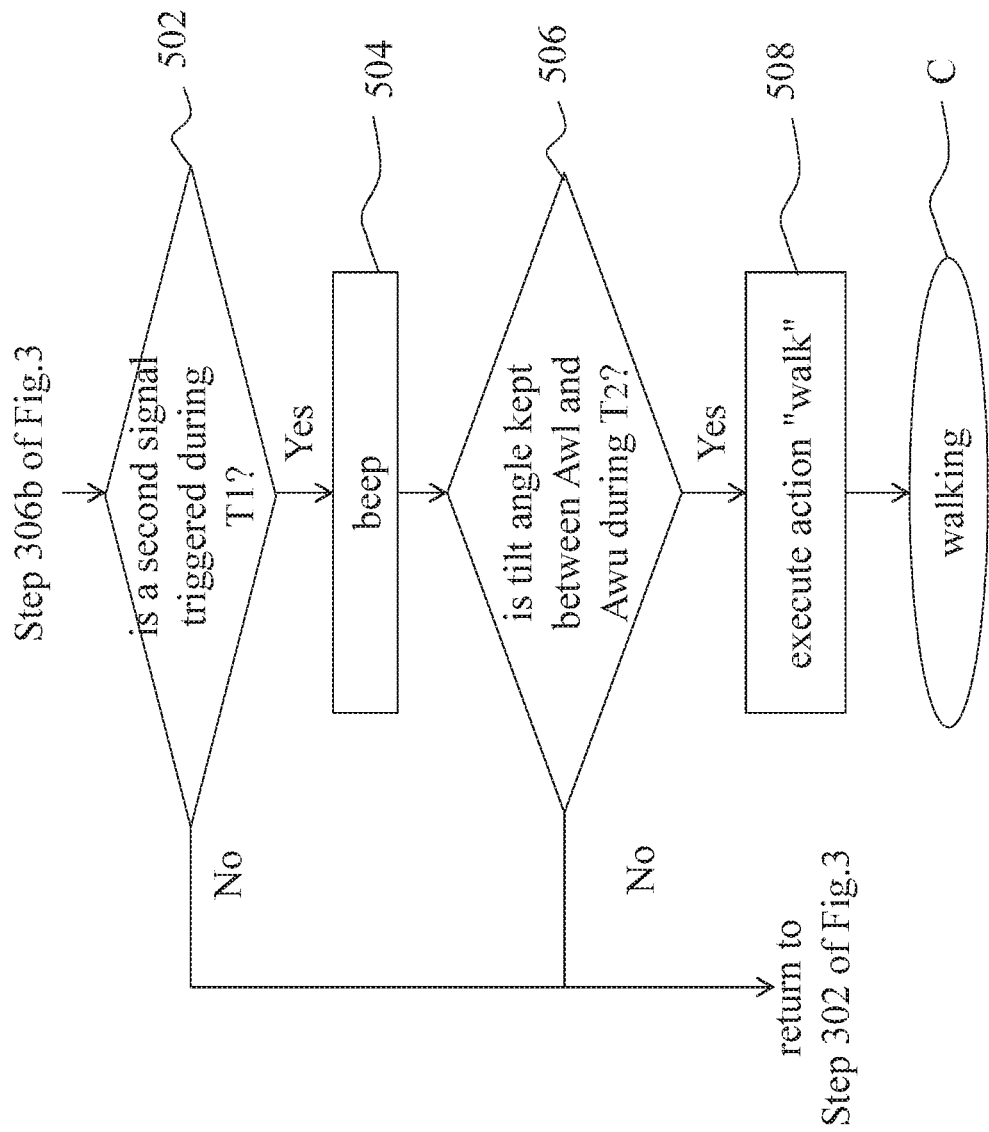
FIG. 5 is a flowchart illustrating a method for controlling the exoskeleton robot of FIG. 1A to execute a walk action when a walking posture is determined in FIG. 3.

FIG. 5 is a flowchart illustrating a method for controlling the exoskeleton robot of FIG. 1A to execute a walk action when a walking posture is determined in FIG. 3. After step 306b of FIG. 3, the flow goes to step 502 to check if the second signal is triggered during a first time period T1. In step 504, an alarm, such as beep, will be sounded if the second signal is received during the first time period T1. In step 506, the tilt angle is kept being checked until the beep ends after a second time period T2. If the tilt angle keeps be suitable for the walking action, for example, between a walking lower bound angle (Awl) and a walking upper bound angle (Awu) during the second time period T2, the action "walk" will be executed in step 508, and the posture of the exoskeleton robot 10 will be changed to the walking posture, the status C. Otherwise, if the tilt angle cannot keep be suitable for the walking action during the second time period T2, the action "walk" is cancelled, and the exoskeleton robot is restored to the standing posture.

Figure 6:
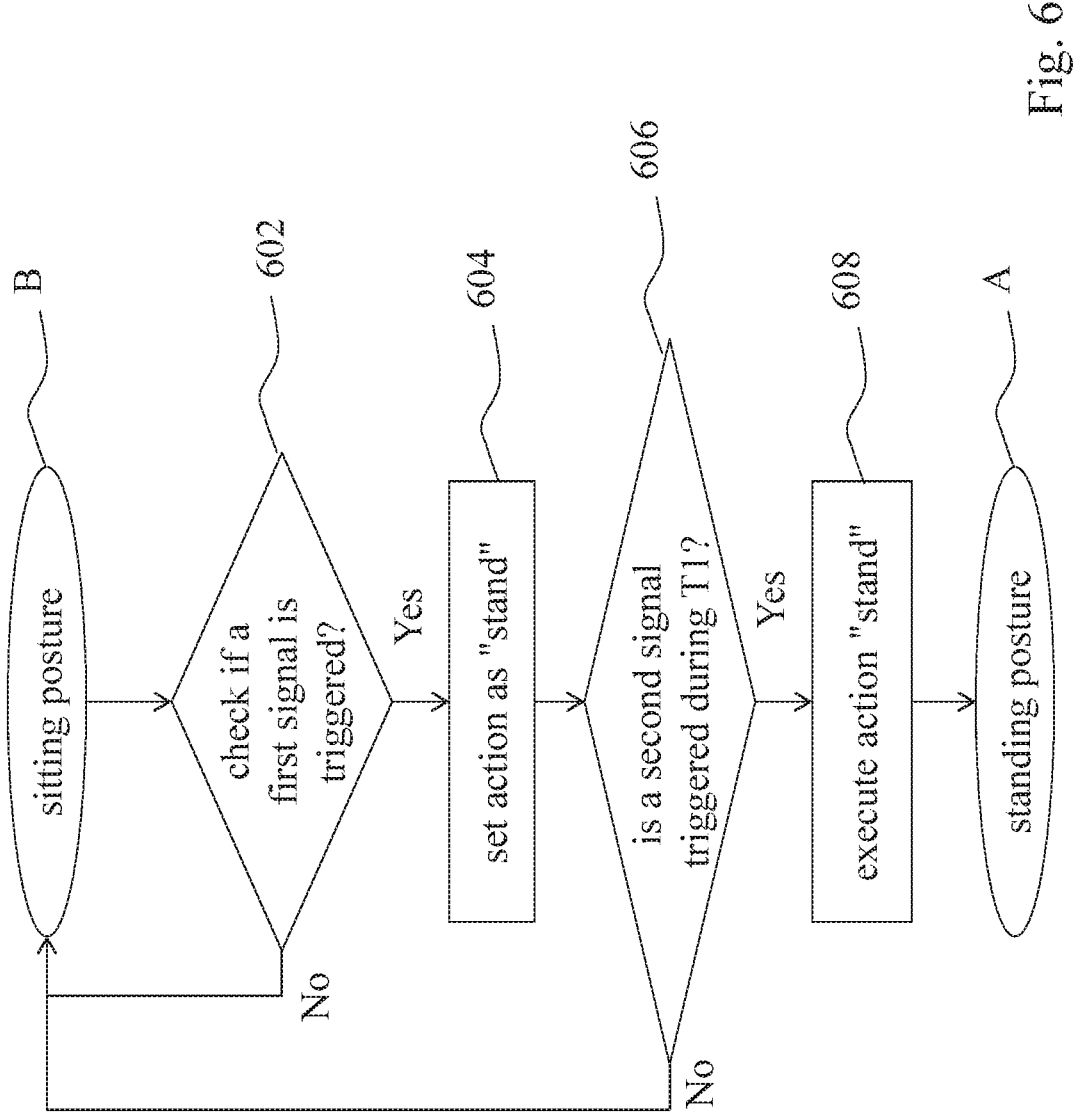
FIG. 6 is a flowchart illustrating a method for controlling the exoskeleton robot of FIG. 1A to change from a sitting posture to a standing posture, based on an embodiment of the present disclosure.

In some embodiments, the first button and the second button are on different crutches, and the first button or the second button is an only one button of a crutch. Further, to execute an action, the buttons should be triggered in a sequence that the first button is triggered first and then the second button is triggered, or the processor will sound an alarm for the condition that the first button is triggered twice before the second button is triggered, or the second button is triggered before the first button FIG. 6 is a flowchart illustrating a method for controlling the exoskeleton robot of FIG. 1A to change from a sitting posture to a standing posture, based on an embodiment of the present disclosure. The flow starts from the sitting posture, the status B. In step 602, a first signal is kept being checked until the first signal is triggered. Although there is no "stand" button to set the next posture as "standing," the only possible next posture for the sitting posture is "standing" because the standing posture cannot be skipped before the walking posture. Therefore, the action can be set as "stand." After prompting the action "stand" in step 604, the action "stand" can be confirmed by trigger the second signal in step 606. In step 608, if the second signal is received during a first time period T1, an alarm, such as beep, will be sounded, and the action "stand" will be executed until the standing posture, the status A.

Figure 7:
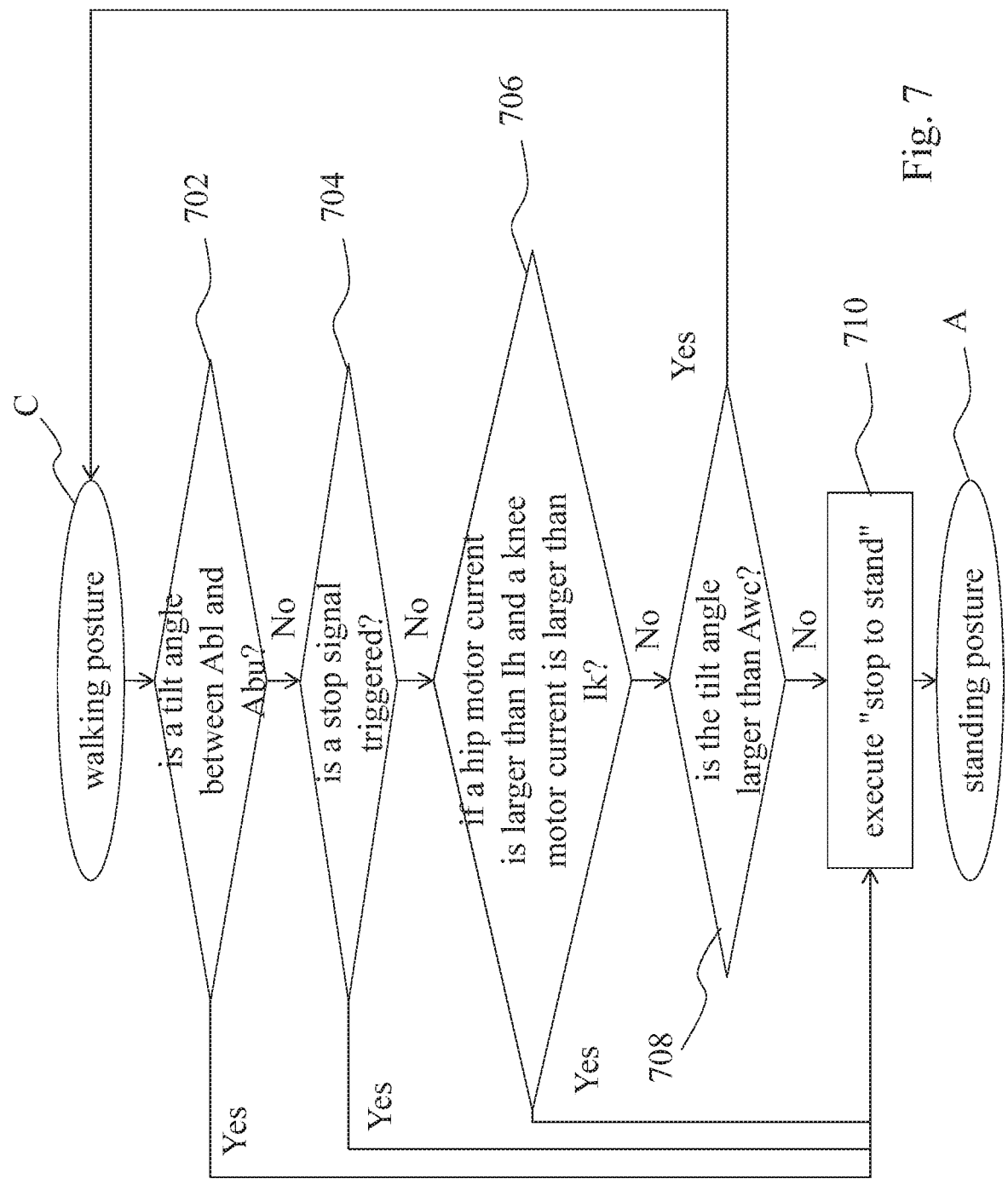
FIG. 7 is a flowchart illustrating a method for controlling the exoskeleton robot of FIG. 1A to change from a walking posture to a standing posture, based on an embodiment of the present disclosure.

FIG. 7 is a flowchart illustrating a method for controlling the exoskeleton robot of FIG. 1A to change from a walking posture to a standing posture, based on an embodiment of the present disclosure. While the exoskeleton robot is in the walking posture, i.e., status C, there are four conditions to stop walking and change the exoskeleton robot to a standing posture, i.e., status A.

First, it is very important to keep the exoskeleton robot in balance, and the tilt angle is very helpful to determine that the user moves in a balance angle. The user may fall backward if the tilt angle is smaller than the balance lower bound angle (Abl), and may fall forward if the tilt angle is larger than the balance upper bound angle (Abu). Referring to Step 702 of FIG. 7, a tilt angle is checked, and an action is determined to keep the exoskeleton robot walking or change the exoskeleton robot to the standing posture based on the tilt angle. The exoskeleton robot 10 is changed to the standing posture if the tilt angle is not in an angle range between a balance lower bound angle (Abl) and a balance upper bound angle (Abu). The walking will be stopped and the exoskeleton robot will be changed to the standing posture if the tilt angle is not suitable for keeping balance, for example, between a balance lower bound angle (Abl) and a balance upper bound angle (Abu).

Secondly, if the user wants to stop walking and be in the standing posture, the user can trigger a stop button of the crutch in step 704. In some embodiments, a button of the left crutch can act as the stop button, and the intent of the user can be determined by checking a stop signal triggered by the stop button. Thus, the walking will be stopped and the exoskeleton robot will be changed to the standing posture if the stop button is triggered.

Thirdly, an obstacle may impede paces of the exoskeleton robot, and the exoskeleton robot should stop walking to avoid falling down. While the obstacle impedes paces of the exoskeleton robot, currents in motors will increase to certain levels. Therefore, the impeded situation can be detected by sampling data of the hip motor current and the knee motor current continuously in step 706. The walking will be stopped and the exoskeleton robot will be changed to the standing posture if the hip motor current is larger than a hip motor current threshold (Ih) and the knee motor current is larger than a knee motor current threshold (Ik) for samples continuously.

Finally, the user needs to lean forward while the user is walking, or the user should stop walking. The exoskeleton robot 10 can step forward only if the tilt angle is larger than a walking-continuous-threshold angle (Awc), over which the user may continuously walk safely. Thus, the walking will be stopped and the exoskeleton robot will be changed to the standing posture if the tilt angle is detected smaller than a walking-continuous-threshold angle (Awc) in step 708.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for controlling an exoskeleton robot, the method comprising:
   checking that a first signal is received, wherein the first signal indicates to change the exoskeleton robot from a standing posture to another posture;
   checking a tilt angle, wherein the tilt angle is a leaning-forward angle of a waist assembly of the exoskeleton robot relative to a line vertical to ground;
   setting an action based on the tilt angle, wherein the action is set as sit if the tilt angle is smaller than a sitting upper bound angle, or set as walk if the tilt angle is between a walking lower bound angle and a walking upper bound angle; and
   executing the action to move the exoskeleton robot.

2. The method of claim 1, further comprising:
   checking that a second signal is received; and
   confirming the action.

3. The method of claim 2, further comprising sounding an alarm if the first signal is received after the second signal.

4. The method of claim 2, further comprising sounding an alarm if the first signal is received twice before the second signal is received.

5. The method of claim 1, further comprising
   setting a button of a crutch as a first button to trigger the first signal.

6. The method of claim 5, wherein the button is disposed on a handgrip of the crutch.

7. The method of claim 1, further comprising:
   repeating the step of checking the tilt angle; and,
   canceling the action and returning to the step of checking that the first signal is received if the tilt angle is checked changed.

8. The method of claim 1, further comprising:
   checking that the first signal is received while the exoskeleton robot is in a sitting posture;
   setting the action as stand;
   checking that a second signal is received; and
   executing the action until the exoskeleton robot is in the standing posture.

9. A method for controlling an exoskeleton robot, the method comprising:
   keep checking a tilt angle, a hip motor current and a knee motor current while the exoskeleton robot is walking, wherein the tilt angle is a leaning-forward angle of a waist assembly of the exoskeleton robot relative to a line vertical to ground; and
   deciding an action to keep the exoskeleton robot walk or change the exoskeleton robot to a standing posture based on the tilt angle, the hip motor current and the knee motor current.

10. The method of claim 9, further comprising changing the exoskeleton robot to the standing posture if the tilt angle is smaller than a walking-continuous-threshold angle.

11. The method of claim 9, further comprising changing the exoskeleton robot to the standing posture if the tilt angle is not between a balance lower bound angle and a balance upper bound angle.

12. The method of claim 9, further comprising
   checking that a stop signal is received while the exoskeleton robot is walking; and
   changing the exoskeleton robot to the standing posture if the stop button is received.

13. The method of claim 9, further comprising
   changing the exoskeleton robot to the standing posture if the hip motor current is larger than a hip motor current threshold and the knee motor current is larger than a knee motor current threshold.

14. An exoskeleton robot, comprising:
   a waist assembly;
   two leg assemblies pivotally connected to the waist assembly via two hip joints, wherein the two leg assemblies comprising two thigh stands, two knee joints, and two shank stands connected to the two thigh stands with the two knee joints;

two shoe assemblies connected to the two leg assemblies via two ankle joints;

a processor connected to two hip motors driving the two hip joints, and two knee motors driving the two knee joints; and a detector for detecting a tilt angle and sending a tilt signal to the processor, wherein the tilt angle is a leaning-forward angle of a waist assembly of the exoskeleton robot relative to a line vertical to ground, wherein the processor decides an action based on the tilt signal, the processor changes the exoskeleton robot to a standing posture if the tilt angle is smaller than a walking-continuous-threshold angle or not between a balance lower bound angle and a balance upper bound angle, and controls the two hip motors and the two knee motors to control the action of the exoskeleton robot.

15. The exoskeleton robot of claim 14, further comprising a first crutch with a first button; and a receiver mounted on the exoskeleton robot and connected to the processor for receiving a first signal triggered through the first button and sending the first signal to the processor, wherein the processor decides the action based on the first signal.

16. The exoskeleton robot of claim 15, wherein the first button is disposed on a handgrip of the first crutch.

17. The exoskeleton robot of claim 14, further comprising a second crutch with a second button, wherein a second signal is triggered by the second button, wherein the receiver receives the second signal and sends the second signal to the processor, and the processor executes the action after the second signal confirms the action decided based on the first signal.

18. The exoskeleton robot of claim 17, wherein each of the first button and the second button is an only button of each of the first crutch and the second crutch.

19. The exoskeleton robot of claim 17, wherein the second button is disposed on a handgrip of the second crutch.

20. The exoskeleton robot of claim 14, further comprising:

a hip motor current detector for detecting a hip motor current from the hip motors; and a knee motor current detector for detecting a knee motor current from the knee motors.

* * * * *